United States Patent [19]
Westberg

[11] Patent Number: 5,325,375
[45] Date of Patent: Jun. 28, 1994

[54] METHOD AND APPARATUS FOR NON-ATOMIC LEVEL PARITY PROTECTION FOR STORING DATA IN A RANDOM ACCESS MEMORY

[75] Inventor: Thomas E. Westberg, Lincoln, Mass.

[73] Assignee: Sun Microsystems, Inc., Mountain View, Calif.

[21] Appl. No.: 723,204

[22] Filed: Jun. 28, 1991

[51] Int. Cl.⁵ .............................................. G06F 11/10
[52] U.S. Cl. .................................... 371/51.1; 371/49.1
[58] Field of Search .................... 371/51.1, 49.1, 30.1, 371/37.4, 49.3, 49.2, 48

[56] References Cited

U.S. PATENT DOCUMENTS

| | | | |
|---|---|---|---|
| 4,019,033 | 4/1977 | Parmet | 340/173 BB |
| 4,942,575 | 7/1990 | Earnshaw et al. | 371/10.1 |
| 4,980,888 | 12/1990 | Bruce et al. | 371/21.1 |
| 4,993,028 | 2/1991 | Hillis | 371/39.1 |

FOREIGN PATENT DOCUMENTS

| | | |
|---|---|---|
| 0418457A2 | 3/1991 | Fed. Rep. of Germany . |
| 0155018 | 9/1985 | Netherlands . |
| 0323030 | 7/1989 | United Kingdom . |
| 0381885 | 8/1990 | United Kingdom . |

Primary Examiner—Robert W. Beausoliel, Jr.
Assistant Examiner—Phung M. Chung
Attorney, Agent, or Firm—Blakely Sokoloff Taylor & Zafman

[57] ABSTRACT

The method and apparatus provides a parity bit for every m multiples of b bits, a group of b bits being the smallest number of bits that can be manipulated by the CPU. The parity bit is computed for the entire m x b bits during a write operation, even if only a subset of the m multiples of b bits is being stored. The write operation is implemented as a read-modify-write operation of the entire m x b bits, with parity error reporting suppressed for the read portion of the operation. However, the parity bit is set factoring in whether a parity error is detected during the read portion of the operation. The parity bit for the entire m x b bits is checked during a read operation, even if only a subset of the m multiples of b bits is needed. Any detected parity error is reported to the CPU. As a result, hardware cost is substantially reduced with minimal degradation to data integrity. Furthermore, the method and apparatus is completely transparent to the CPU and the operating system.

30 Claims, 4 Drawing Sheets

5,325,375

METHOD AND APPARATUS FOR NON-ATOMIC LEVEL PARITY PROTECTION FOR STORING DATA IN A RANDOM ACCESS MEMORY

BACKGROUND OF THE INVENTION

1. Field of the Invention

The present invention is related to the field of computer systems. More particularly, the present invention is a method and apparatus for providing non-atomic level parity protection for storing data in a random access memory.

2. Art Background

Traditionally, the smallest amount of data stored in the random access memory (RAM) 16 that can be manipulated directly by the central processing unit (CPU) (not shown) of a computer system 10, is a byte, i.e. eight bits, 22a, 22b, 22c or 22d (FIG. 1a), even though there are machine instructions available for a programmer to read or write in bytes, half-words, i.e. two bytes, full-words, i.e. four bytes, or double-words, i.e. eight bytes. That is why, typically parity protection provided for storing data in the RAM 16 is provided at this atomic level, i.e. the byte level. An additional ninth bit, 24a, 24b, 24c, or 24d is provided for every byte 22a, 22b, 22c, or 22d, to be used as the parity bit. Thus, for a "thirty-two bit computer system", the data path 18 between the RAM 16 and the RAM controller 14 is typical thirty-six bits, even though the four parity bits 24a, 24b, 24c, or 24d are not accessible to the user.

The parity bit of each byte is set or reset by the random access memory controller during each write operation. Typically the RAM controller receives the data from the CPU, block 32 (FIG. 1b). The RAM controller determines which byte or bytes need to be written, block 34. The RAM controller then generates the corresponding parity bits for the bytes to be written, block 36. Each parity bit is set or reset so that the total number of 1 bits for each byte is always odd or even, depending on whether odd parity or even parity is used by the computer system. After generating the parity bits, the RAM controller writes the appropriate byte or bytes into the RAM along with their parity bits, block 38.

The parity bit in turn is checked by the RAM controller during each read operation. Typically, the RAM controller retrieves the whole word from the RAM, block 42 (FIG. 1c). The RAM controller determines which byte or bytes are being fetched 44 and returns only what is needed to the CPU 46. At the same time, the RAM controller checks the parity bit of each byte being returned for error 48, and reports the parity error to the CPU 49 if detected.

The traditional way of providing parity protection is costly, particularly in terms of hardware space for microcomputers. One ninth of the random access memory is used for parity protection. As will be discussed, the present invention overcomes the disadvantage of the prior art and provides a method and apparatus for providing non-atomic level parity protection for storing data in random access memory.

SUMMARY OF THE INVENTION

A method and apparatus for providing non-atomic level parity protection for storing data in a random access memory is disclosed. The method and apparatus substantially reduces hardware cost with minimal degradation to data integrity. Furthermore, the method and apparatus is completely transparent to the CPU and the operating system.

The preferred embodiment of the method and apparatus of the present invention provides a parity bit for every m multiples of b bits, a group of b bit being the smallest number of bits that can be manipulated by the CPU. The parity bit is computed for the entire m x b bits during a write operation, even if only a subset of the m multiples of b bits is being stored. The write operation is implemented as a read-modify-write operation of the entire m x b bits, with parity error reporting suppressed for the read portion of the read-modify-write operation. However, the parity bit is set factoring in whether a parity error is detected during the read portion of the read-modify-write operation. The parity bit for the entire m x b bits is checked during a read operation, even if only a subset of the m multiples of b bits is needed. Any detected parity error is reported to the CPU.

For example, for a 32-bit computer system, the method and apparatus of the present invention provides a parity bit for every full word. The parity bit is computed for the entire full word during a write operation, even if only a byte or half-word is being stored. The write operation is implemented as a read-modify-write operation for the entire full word as outlined above. Similarly, the parity bit for the entire full word is checked during a read operation, even if only a byte or half-word is needed.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION OF THE INVENTION

A method and apparatus for providing non-atomic level parity protection for storing data in a random access memory (RAM) is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1A:
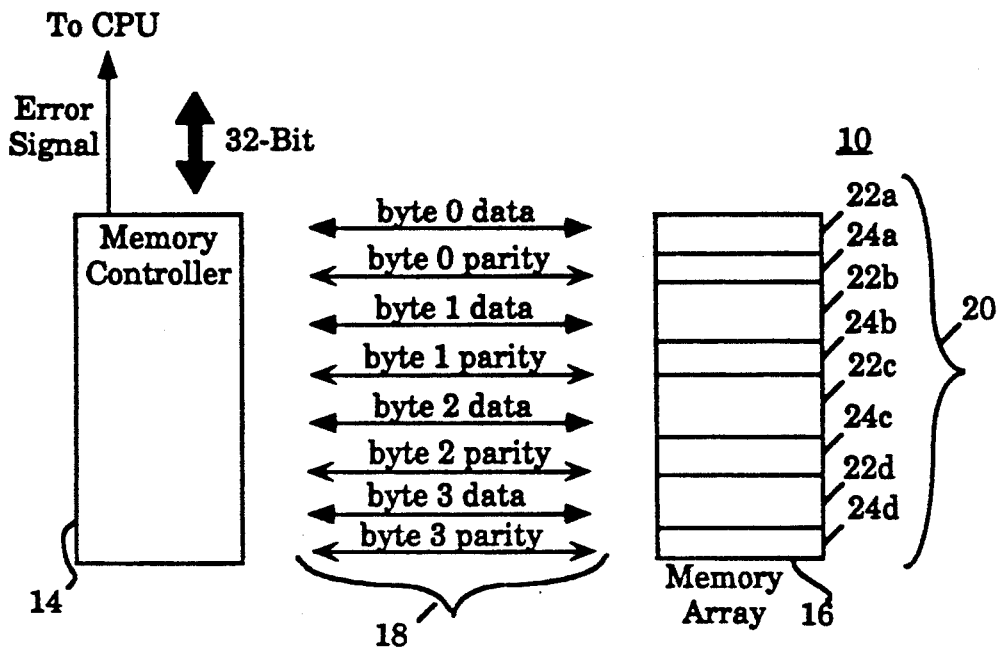
FIGS. 1a-1c show block diagrams illustrating atomic level parity protection for storing data in a random access memory of the prior art.
Figure 1B:
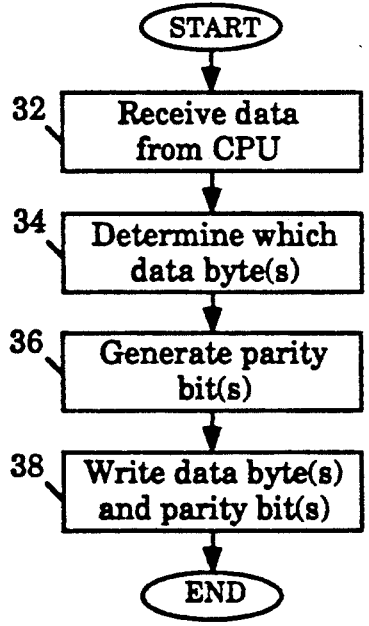
Figure 1C:
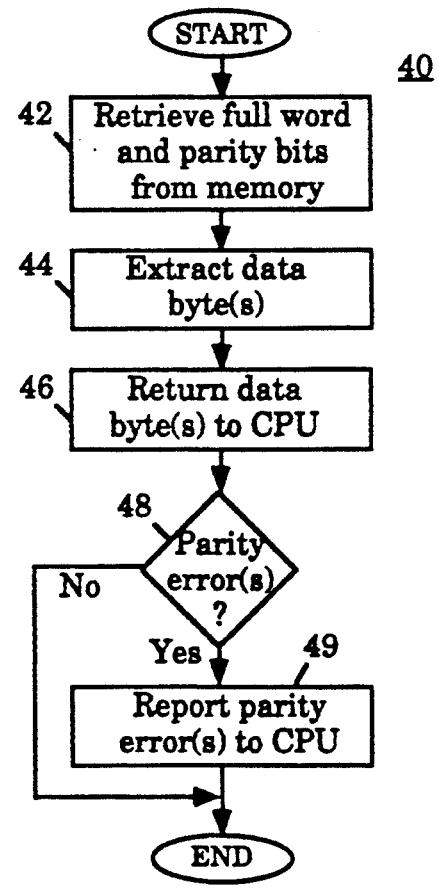
Figure 2:
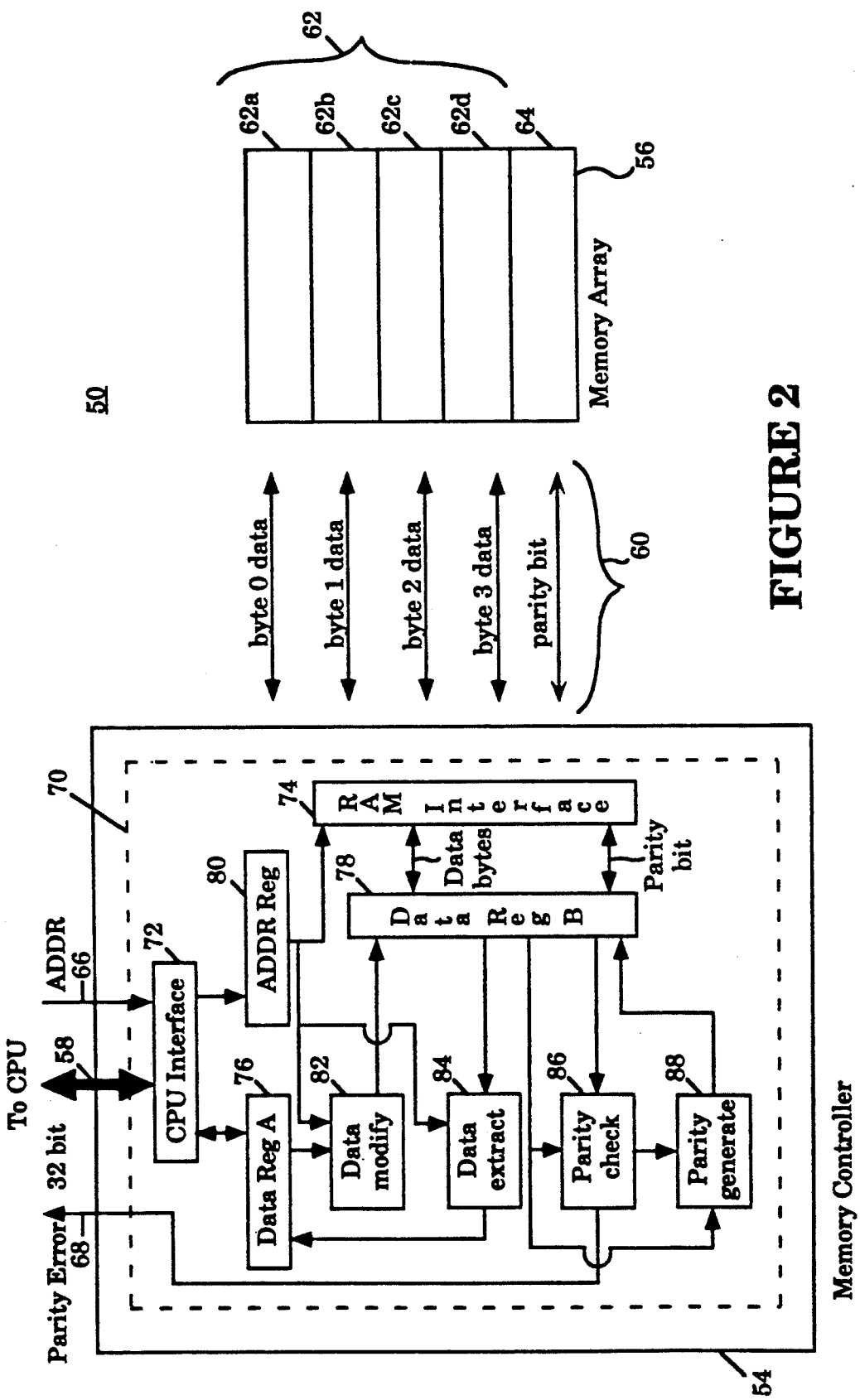
FIG. 2 shows a block diagram illustrating a physical view of the hardware elements of the preferred embodiment of the apparatus of the present invention.

Referring now to FIG. 2, a block diagram illustrating a physical view of the hardware elements of the preferred embodiment of the apparatus of the present invention is shown. The preferred embodiment of the apparatus of the present invention 70 is shown in the context of a RAM controller 54 coupled to a central processing unit (CPU) (not shown), and a plurality of RAM arrays 56, of an exemplary 32-bit computer system 50. The data paths 58 and 60 between the RAM controller 54 and the CPU, and between the RAM controller 54 and the RAM arrays 56, are thirty-two bits and thirty-three bits wide respectively. The CPU writes and reads in one byte, half-word, full word or double word. Data writing and data reading are performed asynchronously.

Additionally, the RAM arrays 56 comprises a plurality of memory data locations (four shown, 62a–62d) referenced by a plurality of memory addresses for storing a plurality of data bytes, and a plurality of corresponding memory parity locations (one shown, 64) for storing a plurality of parity bits. For this exemplary 32-bit computer system, one parity bit is provided for every four data bytes stored. The memory data locations and the corresponding memory parity locations are initialized by the RAM controller 54 to a plurality of initial data bytes and a plurality of corresponding initial parity bits respectively, at the beginning of operation.

Continuing reference to FIG. 2, the preferred embodiment of the apparatus of the present invention 70 comprises a plurality of interfaces, 72 and 74, a plurality of registers, 76, 78 and 80, and a plurality of logic circuitry 82, 84, 86 and 88. The plurality of interfaces comprise a central processing unit (CPU) interface 72 coupled with the CPU, and a RAM interface 74 coupled with the RAM arrays 56. The plurality of registers comprises a data register A 76 coupled to the CPU interface 72, a data register B 78 coupled to the RAM interface 74, and an address register 80 coupled to the CPU interface 72 and the RAM interface 74. The plurality of logic circuitry comprise a data modifying circuitry 82 coupled to the data registers A and B, 76 and 78, and the address register 80, a data extracting circuitry 84 coupled to the data registers A and B, 76 and 78, and the address register 80, a parity error checking circuitry coupled to the data register B 78, and the CPU, and a parity bit generating circuitry 88 coupled to the data register B 78 and the parity error checking circuitry 86.

The CPU interface 72 is for interfacing with the CPU to write data into the RAM arrays 56 and to read data from the RAM arrays 56. During a write operation, the CPU interface 72 receives a write signal, a plurality of target memory addresses and a plurality of data bytes to be written from the CPU as inputs. The target memory addresses received indicates a plurality of target memory data locations where the plurality of data bytes are to be written. In response, the CPU interface 72 outputs the target memory addresses and the data bytes received into the data register A 76 and the address register 80 respectively.

During a read operation, the CPU interface 72 receives a read signal, and a plurality of source memory addresses from the CPU as inputs. The source memory addresses indicates a plurality of source memory data locations where a plurality of data bytes are to be read. In response, the CPU interface 72 outputs the source memory addresses received into the address register 80. The CPU interface 72 also subsequently detects the presence of the plurality of retrieved data bytes in the data register A 76, during the read operation. In response, the CPU interface 72 outputs the plurality of retrieved data bytes for the CPU.

The RAM interface 74 interfaces with the RAM arrays 58 to write data into the RAM arrays 58 and to read data from the RAM arrays 58. During a writing operation, the RAM interface 74 detects the presence of the plurality of target memory addresses in the address register. In response, if the target memory addresses indicate less than a full word is being written, the RAM interface 74 retrieves a full word and its parity bit from the RAM arrays 58 and outputs the retrieved full word and its parity bit into the data register B 78; otherwise, the RAM interface 74 takes no action. If retrieved, the full word and its parity bit are retrieved from the four memory data locations that comprise the memory data locations being referenced by the target memory addresses and the corresponding memory parity location.

During the write operation, the RAM interface 74 also subsequently detects the presence of a full word and its parity bit to be written into the RAM arrays 56 in data register B 78. The full word to be written comprises the plurality of data bytes to be written. In response, the RAM interface 74 writes the full word and its parity bit into four memory data locations that comprise the memory data locations being referenced by the target memory addresses and the corresponding memory parity location.

During the read operation, the RAM interface 74 detects the presence of the plurality of source memory addresses in the address register 80. In response, the RAM interface 74 retrieves a full word and its parity bit from the RAM arrays 58 and outputs the retrieved full word and the retrieved parity bit into the data register B 78 respectively. The full word and its parity bit are retrieved from the four memory data locations that comprise the memory data locations being referenced by the source memory addresses and the corresponding memory parity location.

The data modifying circuitry 82 processes the data bytes to be written into the RAM arrays 58 and prepares them for writing into the RAM arrays 58. During the write operations, the data modifying circuitry 82 detects the data bytes to be written in the data register A 76 and outputs the data bytes to be written into the appropriate byte positions of data register B 78. If less than a full word is being written, the data bytes being written are effectively merged into the full word stored in the data register B 78.

The data extracting circuitry 84 processes data bytes being read for return to the CPU and prepares them for return to the CPU. During the read operations, the data extracting circuitry 84 detects the data bytes to be read and return to the CPU in the data register A 76, extracts the data bytes to be read from the data register B 78, and outputs them into data register A 76.

The parity error checking circuitry 86 checks for parity error and reports them during the data writing and the data reading operations. During the write operations, the parity error checking circuitry 86 detects the presence of the retrieved full word and the retrieved parity bit in the data register B 78 and conditionally outputs a signal for input to the parity bit generating circuitry 88 if a parity error is detected. The parity error checking is performed immediately after the retrieved full word and its parity bit are stored into the data register B 78 and before the data bytes being written are stored into the data register B 78.

During the read operation, the parity error checking circuitry 86 detects the presence of the retrieved full word in the data register B 78 and the retrieved parity bit in the data register B 78. In response, the parity error checking circuitry 86 conditionally outputs a signal for the CPU if a parity error is detected. The parity error checking is performed substantially simultaneous with the extraction and returning of the data bytes to be read to the CPU.

The parity bit generating circuitry 88 generates the parity bit associated with the full word to be written into the RAM arrays 56. During a write operation, the parity bit generating circuitry 88 detects the presence of the full word to be written in the data register B 78 generates the parity bit and outputs the generated parity bit into the data register B 78. The parity bit is generated in a standard manner using well known parity generating techniques. However, if a parity error is detected for the retrieved full word and its parity bit, the generated parity bit is inverted before being stored into the data register B 78. The parity bit is generated immediately after the data bytes to be written are stored into the data register B 78 and before the full word to be written are written into the RAM arrays 56.

Figure 3:
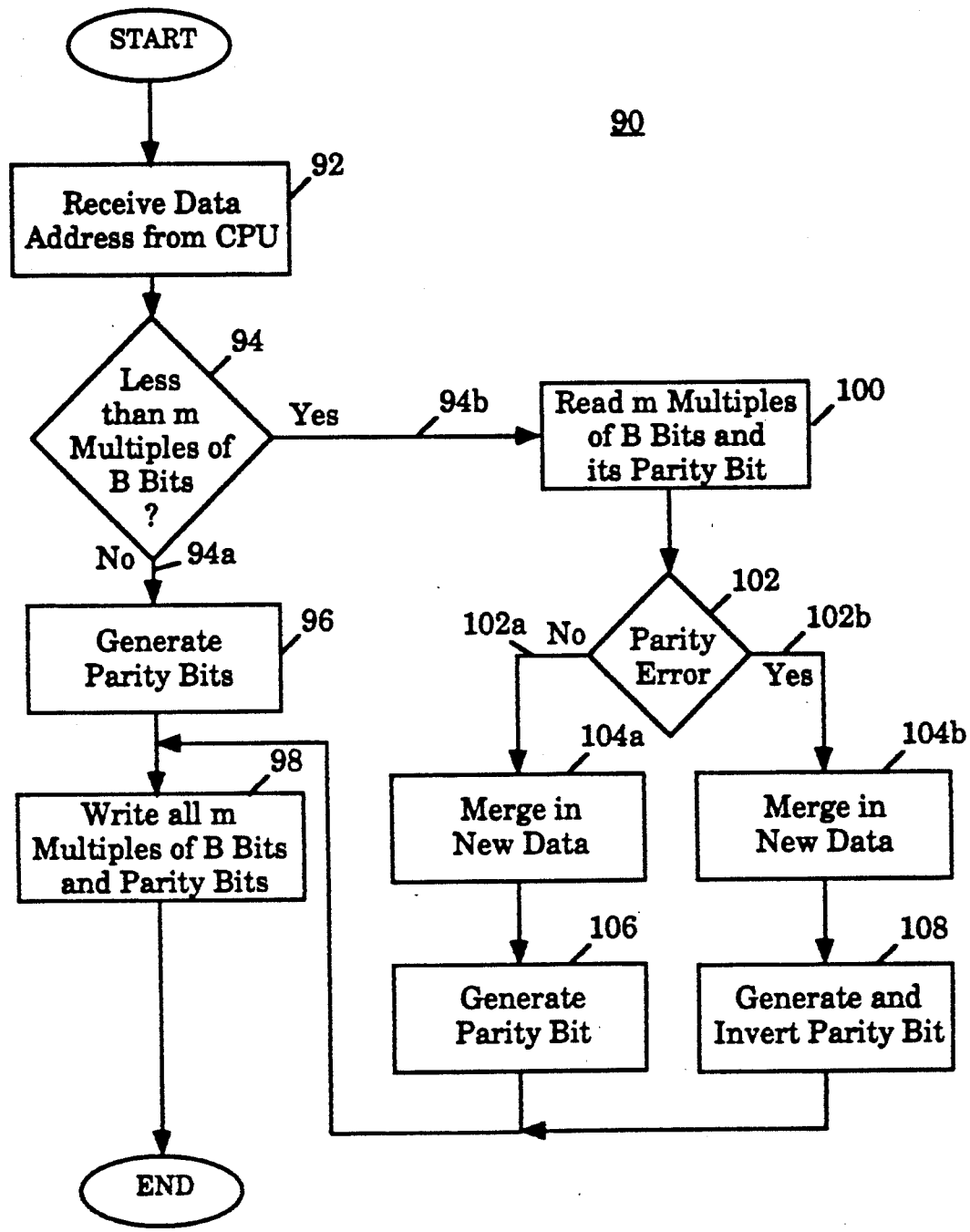
FIG. 3 shows a block diagram illustrating a logical view of the write algorithm used by the method of the present invention.

Referring now to FIG. 3, a block diagram illustrating a logical view of the write algorithm used by the method of the present invention is shown. Initially, data to be written and target memory addresses for their storing memory data locations are received from the CPU, block 92. The data to be written are checked to determine if less than m multiples of b bits are being written, block 94. Data are being manipulated by the CPU in multiples of b bits, where a group of b bits is the smallest number of data bits that can be manipulated by the CPU. M is a pre-determined constant.

If the data to be written is not less than m multiples of b bits, branch 94a, a parity bit for the m multiples of b bits to be written is generated block 96. The parity bit is generated in a standard manner as previously described. Then, at block 98, the m multiple of b bits to be written and the corresponding parity bit are respectively stored into the memory data locations referenced by the target memory addresses received and the memory parity location corresponding to the referenced memory data locations.

If the data to be written is less than m multiples of b bits, branch 94b, m multiples of b bits and the corresponding parity bit are retrieved from the RAM arrays, block 100. The m multiple of b bits and their parity bit are retrieved from m memory data locations referenced by m memory addresses and the corresponding memory parity location. The m memory addresses comprise the target memory addresses received, and the m memory data locations comprises the memory data locations referenced by the target memory addresses received. The retrieved m multiple of b bits and their parity bit is checked for parity error, block 102.

If a parity error is not detected, branch 102a, the multiples of b bits to be written are merged into the retrieved m multiple of b bits, block 104a, as previously described, and a parity bit is generated for the merged m multiples of b bits, block 106. The parity bit is generated in a standard manner as previously described. The merged m multiple of b bits and their parity bit are subsequently stored into the memory data locations and the corresponding memory parity location respectively, where the pre-merged m multiple of b bits and their parity bit were previously retrieved, block 98.

If a parity error is detected, branch 102b, the multiples of b bits to be written are merged into the retrieved m multiple of b bits, block 104b, as previously described, and a parity bit is generated for the merged m multiples of b bits, block 108. The parity bit is generated in a standard manner and then inverted as previously described. Once the parity bit is generated, at block 98, the merged m multiple of b bits and the corresponding parity bit are stored into the memory data locations and the corresponding memory parity location respectively, where the pre-merged m multiple of b bits and their parity bit were previously retrieved.

Figure 4:
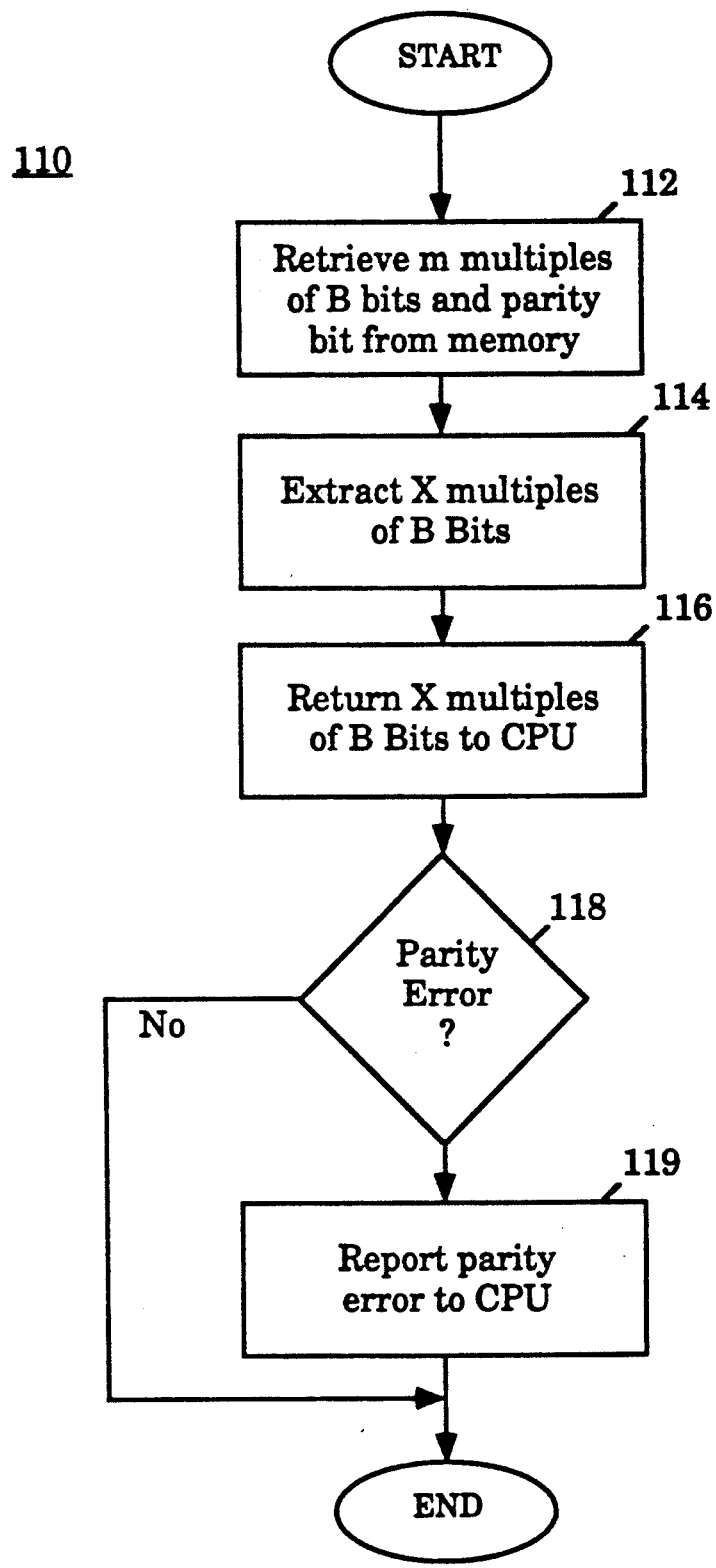
FIG. 4 shows a block diagram illustrating a logical view of the read algorithm used by the method of the present invention.

Referring now to FIG. 4, a block diagram illustrating a logical view of the read algorithm used by the method of the present invention is shown. Initially, m multiples of b bits and their parity bit are retrieved from the RAM arrays after receiving a plurality of source memory addresses from the CPU, block 112. The m multiples of b bits and the corresponding parity bit are retrieved from m memory data locations referenced by m memory addresses and the corresponding memory parity location. The m memory addresses comprise the source memory addresses received, and the m memory data locations comprise the memory data locations referenced by the source memory addresses received. As described earlier, data are being manipulated by the CPU in multiples of b bits, where a group of b bits is the smallest amount of data bits that can be manipulated by the CPU and m is a pre-determined constant.

At block 116, the multiples of b bits to be read are extracted from the m multiples of b bits retrieved, block 114; and returned to the CPU. The retrieved m multiples of b bits and the corresponding parity bit are checked for parity error, block 118. If detected, the parity error is reported to the CPU, block 119. As described earlier, the parity error is checked substantially simultaneous with the extraction and returning of the multiples of b bits to be read.

It will be appreciated that the method and apparatus of the present invention is completely transparent to the CPU and the operating system. Furthermore, the degradation in data integrity is minimal. If the data value is never read back, the user never suffers from the effect of the parity error. If the parity error is a "soft" error, e.g. an alpha hit, the data value will be read back correctly in subsequent reads. If the parity error is a "hard" error, the parity error will be detected again in subsequent read just like the atomic level protection. The only error case that is less likely to be detected with the present invention is if multiple bits in multiple atomic bit groups are in error, e.g. two different bits from two different bytes.

While the apparatus of the present invention has been described in the context of an exemplary thirty-two bit computer system, those skilled in the art will recognize that the invention is not limited to the exemplary 32-bit computer system referenced, particularly in view if the description of the method of the present invention. The method and apparatus of the present invention can be practiced with modification and alteration within the spirit and scope of the appended claims.

What is claimed is:

1. A method for providing non-atomic level parity protection for storing data in a random access memory, said method comprising the steps of:

a data write step, said data write step comprising the steps of:

a receiving step, comprising receiving $n_1$ memory addresses and a first $n_1$ group of b bits from a CPU, where $n_1$ equals at least one, said $n_1$ memory addresses indicating $n_1$ memory data locations of a random access memory where said first $n_1$ group of b bits are to be stored;

a storing step, comprising storing said first $n_1$ group of b bits into said first $n_1$ memory data locations of said random access memory using a read-modify-write of a first w groups of b bits, where w is a pre-determined constant and greater than $n_1$, said first w groups of b bits being stored in a first w memory locations indicated by a first w memory addresses, said first w memory data locations comprising said first $n_1$ memory data locations, said first w memory addresses comprising said first $n_1$ memory addresses, said first w groups of b bits being read from said first w memory locations, said first w groups of b bits being modified by said first $n_1$ group of b bits resulting in a modified first w groups of b bits before being written back into said first w memory data locations;

a parity bit generating step, comprising generating a first parity bit based on said modified first w groups of b bits, a second parity bit providing parity for said first w groups of b bits and retrieved from a first memory parity location of said random access memory, said generated first parity bit being stored into said first memory parity location;

a parity bit storing step, comprising storing said first parity bit, wherein said parity bit generating step and said parity bit storing step are performed substantially simultaneous with said data write step.

2. The method for providing non-atomic level parity protection for storing data in a random access memory as set forth in claim 1, wherein w is a predetermined constant equal to $n_1$ and said parity bit generating step and said parity bit storing step are performed substantially simultaneous with said storing step.

3. The method for providing non-atomic level parity protection for storing data in random access memory as set forth in claim 2, wherein said method further comprises the steps of:

a data read step, said data read step comprising the steps of:
  a second receiving step, comprising receiving $n_2$ memory addresses from said CPU, where $n_2$ equals at least one, said $n_2$ memory addresses indicating $n_2$ memory data locations of said random access memory where $n_2$ group of b bits are to be retrieved;
  a retrieving step, comprising retrieving a second w groups of b bits from a second w memory locations of said random access memory indicated by a second w memory addresses, where w is not less than $n_2$, said second w groups of b bits comprising said $n_2$ group of b bits, said second w memory locations comprising said $n_2$ memory data locations, said second w memory addresses comprising said $n_2$ memory addresses;
  an extracting step, comprising extracting said $n_2$ group of b bits from said second w groups of b bits;
  a returning step, comprising returning said $n_2$ group of b bits to said CPU;
a parity bit retrieving step, comprising retrieving a third parity bit being stored in a second memory parity location of said random access memory said third parity bit providing parity for said second w groups of b bits, said third parity bit being retrieved substantially simultaneous with said retrieving step; and a parity check step, comprising checking said retrieved second w groups of b bits and said retrieved third parity bit for a second parity error, and if said second parity error is detected, reporting said second parity error to said CPU, said second parity error being checked and reported substantially simultaneous with said extracting and returning steps.

4. The method for providing non-atomic level parity protection for storing data in a random access memory, as set forth in claim 3, wherein said data write step and said data read step are performed asynchronously.

5. The method for providing non-atomic level parity protection for storing data in a random access memory, as set forth in claim 4, wherein said first w groups of b bits and said second parity bit, said modified first w groups of b bits and said first parity bit, and said second w groups of b bits and said third parity bit, are read from and stored into said random access memory through a random access memory data path with a data path width not greater than w+1.

6. The method for providing non-atomic level parity protection for storing data in a random access memory, as set forth in claim 4, wherein,
  said first and second w memory data locations are initialized to a first and second initial w groups of b bits; and
  said first and second memory parity locations are initialized to a first and second initial parity bits based on said first and second initial w groups of b bits respectively.

7. The method for providing non-atomic level parity protection for storing data in a random access memory, as set forth in claim 6, wherein said storing step further comprises the steps of:
  retrieving said first w groups of b bits;
  replacing a second $n_1$ group of b bits of said retrieved first w groups of b bits with said first $n_1$ group of b bits, said second $n_1$ group of b bits being retrieved from said first $n_1$ memory data locations; and
  storing said modified first w group of b bits back into said first w memory locations.

8. The method for providing non-atomic level parity protection by storing data in a random access memory, as set forth in claim 7, wherein said parity bit generating step further comprises the steps of:
  a second parity bit retrieving step, comprising retrieving said second parity bit in conjunction with said first w groups of b bits;
  a second parity check step comprising checking said retrieved first w groups of b bits and said retrieved second parity bit for said first parity error, said first parity error being checked substantially simultaneous with said modification of said first w groups of b bits;
  a parity setting generating step comprising generating a parity setting for said first parity bit based on said modified first w group of b bits in a standard manner, and if said first parity error is detected, inverting said generated parity setting for said first parity bit, said first parity bit being generated immediately after said modification of said first w groups of b bits; and
  storing said first parity bit, said first parity bit being stored in conjunction with said modified first w groups of b bits.

9. An apparatus for providing non-atomic level parity protection for storing data in a random access memory, said apparatus comprising:

first receiving means coupled to a CPU for receiving $n_1$ memory addresses and a first $n_1$ group of b bits from said CPU as input, and outputting said $n_1$ memory addresses and said first $n_1$ group of b bits received, where $n_1$ equals at least one, said $n_1$ memory addresses indicating $n_1$ memory data locations of a random access memory where said first $n_1$ group of b bits are to be stored;

first data storing means coupled to said first receiving means and said random access memory for storing said first $n_1$ group of b bits into said first $n_1$ memory data locations using a read-modify-write of a first w groups of b bits, where w is a pre-determined constant and greater than $n_1$, said first w groups of b bits being stored in a first w memory data locations of said random access memory indicated by a first w memory addresses, said first w memory data locations comprising said first $n_1$ memory data locations, said first w memory addresses comprising said first $n_1$ memory addresses, said first w group of b bits being read from said first w memory locations, said first w group of b bits being modified by said first $n_1$ groups of b bits resulting in a modified first w groups of b bits before being written back into said first w memory data locations;

first parity bit generating and storing means coupled to said first data storing means and said random access memory for generating and storing a first parity bit based on said modified first w groups of b bits, a second parity bit providing parity for said first w groups of b bits and retrieved from a first memory parity location of said random access memory, said first parity bit being stored into said first memory parity location, said generation and storing of said first parity bit being performed substantially simultaneous with said read-modify-write of said first w groups of b bits.

10. The apparatus for providing non-atomic level parity protection for storing data in a random access memory, as set forth in claim 9, wherein said apparatus further comprises:

second data storing means coupled to said first receiving means and said random access memory for storing said first $n_1$ group of b bits into said first $n_1$ memory data locations, where $n_1$ equals said predetermined w; and second parity bit generating and storing means coupled to said second data storing means and said random access memory for generating and storing said first parity bit based on said first $n_1$ group of b bits, said first parity bit being stored into said first memory parity location, said generating and storing of said first parity bit being performed substantially simultaneous with said storing of said first $n_1$ group of b bits.

11. The apparatus for providing non-atomic level parity protection for storing data in a random access memory, as set forth in claim 10, wherein said apparatus further comprises:

second receiving means coupled to said CPU for receiving $n_2$ memory addresses from said CPU, and outputting said $n_2$ memory addresses received, where $n_2$ equals at least one, said $n_2$ memory addresses indicating $n_2$ memory data locations of said random access memory where $n_2$ group of b bits are to be retrieved;

data and parity bit retrieving means coupled to said second receiving means and said random access memory for retrieving a second w groups of b bits and a third parity bit from said random access memory, where w is not less than $n_2$, said second w groups of b bits comprising said $n_2$ group of b bits, said second w group of b bits being stored in a second group of w memory data locations of said random access memory indicated by a second w memory addresses, said second w memory locations comprising said $n_2$ memory data locations, said second w memory addresses comprising said $n_2$ memory addresses, said third parity bit providing parity for said second w groups of b bits and retrieved from a second memory parity location of said random access memory;

data extracting and returning means coupled to said data and parity bit retrieving means and said CPU for extracting said $n_2$ group of b bits from said retrieved second w groups of b bits and for returning said extracted $n_2$ group of b bits to said CPU; and first parity error checking means coupled to said data and parity bit retrieving means and said CPU for checking said retrieved second w groups of b bits and said retrieved third parity bit for said second parity error, and if said second parity error is detected, reporting said second parity error to said CPU, said second parity error being checked and reported substantially simultaneous with said extracting and returning of said extracted $n_2$ group of b bits.

12. The apparatus for providing non-atomic level parity protection for storing data in a random access memory, as set forth in claim 11, wherein said first and second receiving means are the same means, said $n_1$ memory addresses and said first $n_1$ group of b bits, and said $n_2$ memory addresses being received asynchronously.

13. The apparatus for providing non-atomic level parity protection for storing data in a random access memory, as set forth in claim 12, wherein said random access memory comprises a random access memory data path for reading and storing said first w groups of b bits and said second parity bit, said modified first w groups of b bits and said first parity bit, and said second w groups of b bits and said third parity bit, from and into said random access memory, said random access memory data path having a data path width not greater than w+1.

14. The apparatus for providing non-atomic level parity protection for storing data in a random access memory, as set forth in claim 12, wherein said apparatus further comprises initialization means for initializing said first and second w memory data locations to a first and second initial w groups of b bits, and said first and second memory parity locations to a first and second initial parity bits based on said first and second initial w groups of b bits.

15. The apparatus for providing non-atomic level parity protection for storing data in a random access memory, as set forth in claim 14, wherein said first data storing means comprises:

first data register means coupled to said first receiving means for storing said first $n_1$ group of b bits;

first address register means coupled to said first receiving means for storing said $n_1$ memory addresses;

first data reading means coupled to said first address register means and said random access memory for retrieving and outputting said first w groups of b bits;

second data register means coupled to said first data reading means for storing said retrieved first w groups of b bits and said modified first w group of b bits;

means coupled to said first data register means, said address register means, and said second data register means, for replacing a second $n_1$ group of b bits of said retrieved first w groups of b bits with said first $n_1$ group of b bits, said second $n_1$ group of b bits being retrieved from said first $n_1$ memory data locations; and first data writing means coupled to said first address register means, said second data register means and said random access memory for storing back said modified first w group of b bits.

16. The apparatus for providing non-atomic level parity protection for storing data in a random access memory, as set forth in claim 15, wherein said first parity bit generating and storing means comprises:

first parity bit reading means coupled to said first address register means and said random access memory for retrieving and outputting said second parity bit, said second parity bit being retrieved substantially simultaneous with said retrieval of said first w groups of b bits;

first parity bit register means coupled to said first parity bit reading means for storing said second and first parity bits;

second parity error checking means coupled to said second data register means and said first parity bit register means for checking said retrieved first w groups of b bits and said retrieved second parity bit for said first parity error, said first parity error being checked substantially simultaneous with said modification of said first w groups of b bits;

first generating means coupled to said second data register means, said first parity bit register means, and said second parity error checking means for generating a parity setting for said first parity bit, said parity setting being generated based on said modified first w groups of b bits in a standard manner, and if said first parity error is detected, inverting said generated parity setting for said first parity bit, said first parity bit being generated immediately after said modification of said first w groups of b bits; and first parity bit writing means coupled to said first address register means, said first parity register means and said random access memory for storing said first parity bit into said first memory parity location, said first parity bit being stored substantially simultaneous with said modified first w groups of b bits.

17. The apparatus for providing non-atomic level parity protection for storing data in a random access memory, as set forth in claim 16, wherein said second data storing means comprises second data writing means coupled to said first address register means, said first data register means and said random access memory for storing said first $n_1$ group of b bits into said $n_1$ memory data locations.

18. The apparatus for providing non-atomic level parity protection for storing data in a random access memory, as set forth in claim 17, wherein said second parity bit generating and storing means comprises:

second generating means coupled to said first data register means and said first parity bit register means for generating a parity setting for said first parity bit based on said first $n_1$ group of bits in a standard manner, said first parity bit being generated substantially simultaneous with said storing of said first $n_1$ group of b bits; and second parity bit writing means coupled to said first parity register means for storing said first parity bit into first memory parity location, said first parity bit being stored in conjunction with said first $n_1$ group of b bits.

19. The apparatus for providing non-atomic level parity protection for storing data in a random access memory, as set forth in claim 18, wherein said data and parity bit retrieving means comprises:

second address register means coupled to said second receiving means for storing said $n_2$ group of b bits;

second data reading means coupled to said second address register means and said random access memory for retrieving and outputting said second w groups of b bits;

third data register means coupled to said second data reading means for storing said retrieved second w groups of b bits;

second parity bit reading means coupled to said second address register means and said random access memory for retrieving and outputting said third parity bit, said third parity bit being retrieved substantially with said retrieval of said second w groups of b bits; and second parity register means coupled to said second parity bit reading means for storing said retrieved third parity bit;

said first parity error checking means being coupled to said third data register means and said second parity register means.

20. The apparatus for providing non-atomic level parity protection for storing data in a random access memory, as set forth in claim 19, wherein said data extracting and returning means comprises:

extracting means coupled to said third data register means for extracting and outputting said $n_2$ groups of b bits from said second w group of b bits;

fourth register means coupled to said extracting means for storing said $n_2$ groups of b bits; and means coupled to said fourth register means and said CPU for returning said $n_2$ group of b bits to said CPU.

21. The apparatus for providing non-atomic level parity protection for storing data in a random access memory, as set forth in claim 20 wherein, said first and second address register means are the same address register means;

said first and fourth data register means are the same data register means;

said second and third data register means, and said first and second parity register means are the same data and parity bit register means;

said first and second data reading means, said first and second data writing means, said first and second parity bit reading means, and said first and second parity bit writing means are the same reading and writing means;

said first and second parity error checking means are the same parity error checking means;

said first and second parity bit generating means are the same parity bit generating means; and said returning means and said second receiving means are the same means.

22. A random access memory subsystem that employs non-atomic level parity protection for storing data, said random access memory subsystem comprising:

a) controller means, coupled to a CPU, for receiving $n_1$ memory addresses and first $n_1$ group of b bits from said CPU, and for storing said first $n_1$ group of b bits into first $n_1$ memory data locations indicated by said $n_1$ memory addresses, and a first parity bit into a first memory parity location, where $n_1$ equals at least one, said first $n_1$ group of b bits being stored into first $n_1$ memory data locations by said controller means with a read-modify-write of a first w groups of b bits, where w is greater than $n_1$, w being a pre-determined constant, said first w groups of b bits being stored in a first w memory data locations indicated by a first w memory addresses, said first w memory data locations comprising said first $n_1$ memory data locations, said first w memory addresses comprising said first $n_1$ memory addresses, said first w groups of b bits being read from said first w memory data locations by said controller means, said first w groups of b bits being modified with said first $n_1$ group of b bits resulting in a modified first w groups of b bits before being written back into said first w memory data locations by said controller means, said first parity bit being generated by said controller means based on said modified first w groups of b bits, where said pre-determined w is greater than $n_1$, said first parity bit being generated factoring in whether a first parity error is detected for said first w groups of b bits and a second parity bit, said second parity bit corresponding to said first w groups of b bits and retrieved from said first memory parity location, said first memory parity location corresponding to said first w memory locations, said generation and storing of said first parity bit being performed by said controller means substantially simultaneous with said read-modify-write of said first w groups of b bits; and b) random access memory arrays means coupled to said controller means for storing said first w groups of b bits, including said first $n_1$ group of b bits, and said first and second parity bits, said random access memory arrays means comprising said first w memory locations, including said $n_1$ memory data locations, and said first memory parity location.

23. The random access memory subsystem that employs non-atomic level parity protection for storing data, as set forth in claim 22, wherein said $n_1$ equals said pre-determined w, said controller means storing said first $n_1$ group of b bits into said first $n_1$ memory data locations directly; and said controller means generating and storing said first parity bit based on said first $n_1$ group of b bits, said generated first parity bit being stored into said first memory parity location, said generating and storing of said first parity bit being performed substantially simultaneous with said storing of said first $n_1$ group of b bits.

24. The random access memory subsystem that employs non-atomic level parity protection for storing data, as set forth in claim 23, wherein a) said controller means further receives $n_2$ memory addresses from said CPU, returns $n_2$ groups of b bits to said CPU, and if a second parity error is detected, reporting said second parity error to said CPU, where $n_2$ equals at least one, said $n_2$ memory addresses indicating $n_2$ memory data locations where said $n_2$ group of b bits are to be retrieved and returned to said CPU, said $n_2$ groups of b bits being extracted by said controller means from a second w group of b bits, where w is not less than $n_2$, said second w groups of b bits comprising said $n_2$ group of b bits, said second w group of b bits being retrieved by said controller means from a second group of w memory data locations indicated by a second w memory addresses, said second w memory locations comprising said $n_2$ memory data locations, said second w memory addresses comprising said $n_2$ memory addresses, said second w groups of b bits being retrieved by said controller means in conjunction with a third parity bit, said third parity bit corresponding to said second w groups of b bits and retrieved by said controller means from a second memory parity location, said second memory parity location corresponding to said second w memory data locations, said retrieved second w groups of b bits and said retrieved third parity bit being checked for said second parity error by said controller means, and if said second parity error is detected, reporting said second parity error to said CPU by said controller means, said second parity error being checked and reported by said controller means substantially simultaneous with said extracting and returning of said extracted $n_2$ group of b bits;

b) said random access memory arrays means further comprises said second w memory locations and said second memory parity location.

25. The random access memory subsystem that employs non-atomic level parity protection for storing data, as set forth in claim 24, wherein said controller means receives said $n_1$ memory addresses and said first $n_1$ group of b bits, and said $n_2$ memory addresses asynchronously; and said controller means receives and returns said $n_2$ memory addresses and said $n_2$ group of b bits asynchronously.

26. The random access memory subsystem that employs non-atomic level parity protection for storing data, as set forth in claim 25, wherein said random access memory array means comprises:

a random access memory data path for said controller means to read from and store into said first and second w memory locations, and said first and second memory parity locations, said first w groups of b bits and said second parity bit, said modified first w groups of b bits and said first parity bit, and said second w groups of b bits and said third parity bit, said random access memory data path having a data path width not greater than $w+1$.

27. The random access memory subsystem that employs non-atomic level parity protection for storing data, as set forth in claim 26, wherein said w equals thirty-two, said b equals eight, and said $n_1$ and $n_2$ equal two of a plurality of values comprising a value of one, two, four and eight.

28. The random access memory subsystem that employs non-atomic level parity protection for storing data, as set forth in claim 25, wherein said controller means is also for initializing said first and second w memory data locations to a first and second initial w groups of b bits, and said first and second memory parity locations to a first and second initial parity bits based on said first and second initial w groups of b bits.

29. The random access memory subsystem that employs non-atomic level parity protection for storing data, as set forth in claim 28, wherein where said predetermined w is greater than $n_1$, said controller means modifies said retrieved first w groups of b bits by replacing a second $n_1$ group of b bits of said retrieved first w group of b bits with said first $n_1$ groups of b bits, said second $n_1$ group of b bits being retrieved by said controller means from said first $n_1$ memory data locations.

30. The apparatus for providing non-atomic level parity protection for storing data in a random access memory, as set forth in claim 29, wherein where said pre-determined w is greater than $n_1$, said controller means generates and stores said first parity bit by
  retrieving said second parity bit in conjunction with said retrieval of said first w groups of b bits,
  checking for said first parity error substantially simultaneous with said modification of said first w groups of b bits,
  generating a parity setting for said first parity bit based on said modified first w groups of b bits in a standard manner, and if said first parity error is detected, inverts said generated parity setting for said first parity bit, said first parity bit being generated immediately after said modification of said first w groups of b bits, and
  storing said first parity bit substantially simultaneous with said modified first w groups of b bits.

* * * * *